(12) United States Patent
Loomis

(10) Patent No.: US 12,372,211 B2
(45) Date of Patent: Jul. 29, 2025

(54) SYSTEM AND METHOD FOR PROVIDING LIGHTING FOR VARIOUS VENUES

(71) Applicant: Seasons 4, Inc., Toano, VA (US)

(72) Inventor: Jason Loomis, Decatur, GA (US)

(73) Assignee: Seasons 4, Inc., Toano, VA (US)

( * ) Notice: Subject to any disclaimer, the term of this patent is extended or adjusted under 35 U.S.C. 154(b) by 150 days.

(21) Appl. No.: 17/886,341

(22) Filed: Aug. 11, 2022

(65) Prior Publication Data

US 2022/0381408 A1 Dec. 1, 2022

Related U.S. Application Data

(63) Continuation-in-part of application No. 16/947,958, filed on Aug. 25, 2020, now Pat. No. 11,415,297.

(51) Int. Cl.
*F21S 4/10* (2016.01)
*F16L 55/035* (2006.01)
*F21V 21/008* (2006.01)

(52) U.S. Cl.
CPC ............. *F21S 4/10* (2016.01); *F16L 55/035* (2013.01); *F21V 21/008* (2013.01)

(58) Field of Classification Search
CPC ......... F21S 4/10; F16L 55/035; F21V 21/008; F21V 21/002; F21V 23/001; F21V 23/06; F21W 2131/10; F21Y 2115/10
USPC ................................................ 248/580, 354.3
See application file for complete search history.

(56) References Cited

U.S. PATENT DOCUMENTS

| | | | |
|---|---|---|---|
| 5,106,661 A | 4/1992 | Pitts, Sr. | |
| 5,439,389 A * | 8/1995 | Cheng | F21V 21/002 439/615 |
| 6,176,600 B1 * | 1/2001 | Huang | F21S 4/10 362/396 |
| 6,651,938 B1 | 11/2003 | Moreland | |
| 6,974,347 B1 * | 12/2005 | Lin | F21V 21/002 439/425 |
| 7,195,216 B2 | 3/2007 | Wang | |
| 7,267,852 B1 | 9/2007 | Rosado et al. | |
| 8,506,136 B1 | 8/2013 | Herdt | |
| 8,827,728 B1 * | 9/2014 | Lin | F21S 4/10 439/168 |
| 8,876,546 B2 * | 11/2014 | McGregor | H01R 13/582 439/419 |
| 9,391,377 B2 * | 7/2016 | McGregor | H01R 13/5833 |
| 9,974,405 B1 | 5/2018 | Conlin | |
| 10,578,260 B1 | 3/2020 | Chen | |

(Continued)

*Primary Examiner* — Muhammad Ijaz
(74) *Attorney, Agent, or Firm* — Kinney & Lange, P.A.

(57) ABSTRACT

Apparatus and associated methods relate to a lighting system configured to be suspended overhead between two supporting structures. A tensile force will be imparted to the lighting system as a consequence of suspending the lighting system overhead. The lighting system can include one or more lighting sections connected end to end. Each of the lighting sections has a structural support cable and a light string coupled thereto. Each of the lighting sections has first and second end connectors on first and second ends of the lighting section. The first and second end connectors provide mechanical connection between adjacent structural support cables as well as electrical connection between adjacent light strings. The lighting sections are configured such that the tensile force imparted to the lighting section is mostly borne by the structural support cable.

19 Claims, 9 Drawing Sheets

(56) References Cited

U.S. PATENT DOCUMENTS

| | | |
|---|---|---|
| 11,384,907 B1 * | 7/2022 | Zou ..................... F21V 21/002 |
| 2006/0164831 A1 | 7/2006 | Lai |
| 2007/0019441 A1 | 1/2007 | Moreland |
| 2008/0074893 A1 | 3/2008 | Ham |
| 2009/0309504 A1 | 12/2009 | Hsu |
| 2013/0280945 A1 | 10/2013 | Chobot et al. |
| 2014/0355277 A1 * | 12/2014 | Lin ..................... H01R 33/09 |
| | | 362/391 |
| 2018/0299084 A1 | 10/2018 | Chien |
| 2020/0132281 A1 * | 4/2020 | Huang ................ F21V 21/002 |
| 2021/0364153 A1 * | 11/2021 | Lee ..................... F21V 21/002 |
| 2024/0044479 A1 * | 2/2024 | Loomis .................. F21V 23/04 |

* cited by examiner

Stringer End Tensioner/Fastener Bridge

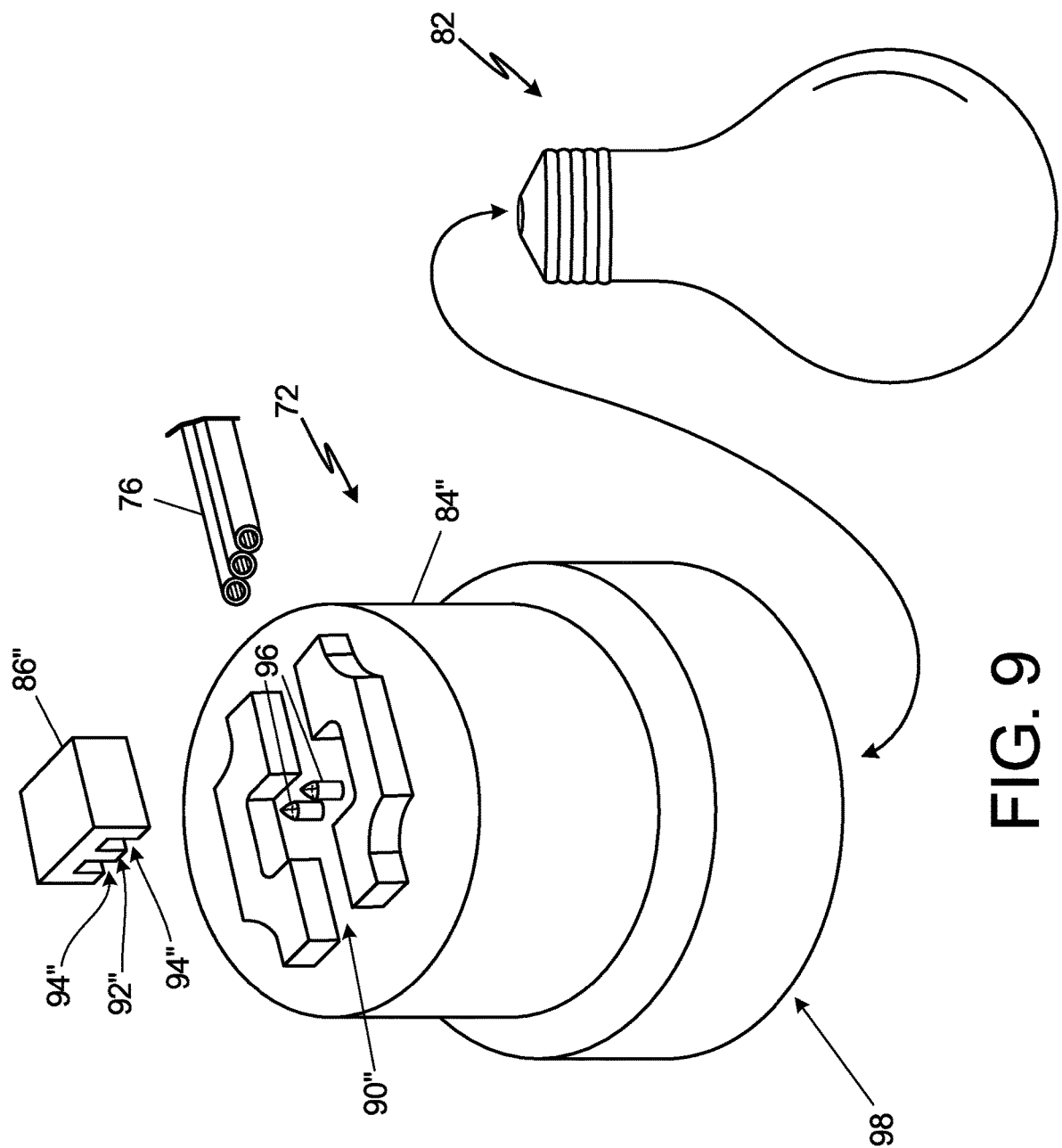

SYSTEM AND METHOD FOR PROVIDING LIGHTING FOR VARIOUS VENUES

CROSS-REFERENCE TO RELATED APPLICATION(S)

This application is a continuation in part of U.S. patent application Ser. No. 16/947,958, entitled "System and Method for Providing Lighting for Various Venues" by Jason Loomis, filed Aug. 25, 2020. This application is also related to U.S. patent application Ser. No. 17/125,465, entitled "Bridge/Splitter Connector for Configuring Electrical Signal Distribution Network" by Jason Loomis, filed Dec. 17, 2020. These applications are incorporated herein by reference in their entirety.

BACKGROUND

Café light strings are strings of lights configured to provide lighting over an open expanse, such as, for example a grassy lawn or a patio. Various other types of light strings can also be configured to provide lighting over such open expanses. These café lights are usually configured as strings of lights suspended over the open expanse between securing structures. A distance between such securing structures can dictate the number of lights and the dimension of a string of such lights. Distances between securing structures at different venues will dictate different numbers of lights and different dimensions of strings of such lights, which are required for these different venues. Thus, every venue requires customized requirements for providing café lighting. An adaptable system for providing café lighting would facilitate installation of café lights in these various venues.

Some café lighting venues can be quite expansive. For such expansive venues, overhead suspension of strings of light can require high tension in support cabling. Should multiple strings of lights be required to span such large expanses, such high tension could cause uncoupling of mechanical and/or electrical connectors or other failures. Such failures can result in inhibiting power to café lights, destruction of the strings of café lights, or even injury to persons situated below the suspended café light strings. Reliable and secure mechanical and electrical connection of multiple strings is needed, especially for large venues.

SUMMARY

Apparatus and associated methods relate to a lighting section that includes a structural support cable and a light string. The structural support cable includes a first connecting member at a first end of the structural support cable. The first connecting member is configured to mechanically connect to a second connecting member of a second end of an adjacent upstream structural support cable. The structural support cable also includes a second connecting member at a second end of the structural support cable. The second connecting member is configured to mechanically connect to a first connecting member and a first end of an adjacent downstream structural support cable. The light string is coupled to the structural support cable so as to be extended along the structural support cable between the first and second connecting ends of the structural support cable. The light string includes a first electrical connector at a first end of the light string. The first electrical connector is configured to receive electrical power from a second electrical connector of an adjacent upstream café light string. The light string includes a second electrical connector at a second end of the light string. The second electrical connector is configured to receive electrical power to a first electrical connector of an adjacent downstream café light string. The light string also includes an electrical cable extending between the first and second electrical connectors.

BRIEF DESCRIPTION OF THE DRAWINGS

FIG. 9 is a perspective view of a lighting-element/cable connector for a custom café lighting system.

DETAILED DESCRIPTION

Apparatus and associated methods relate to a lighting system configured to be suspended overhead between two supporting structures. A tensile force will be imparted to the lighting system as a consequence of suspending the lighting system overhead. The lighting system can include one or more lighting sections connected end to end. Each of the lighting sections has a structural support cable and a light string coupled thereto. Each of the lighting sections has first and second end connectors on first and second ends of the lighting section. The first and second end connectors provide mechanical connection between adjacent structural support cables as well as electrical connection between adjacent light strings. The lighting sections are configured such that the tensile force imparted to the lighting section is mostly borne by the structural support cable.

Figure 1:
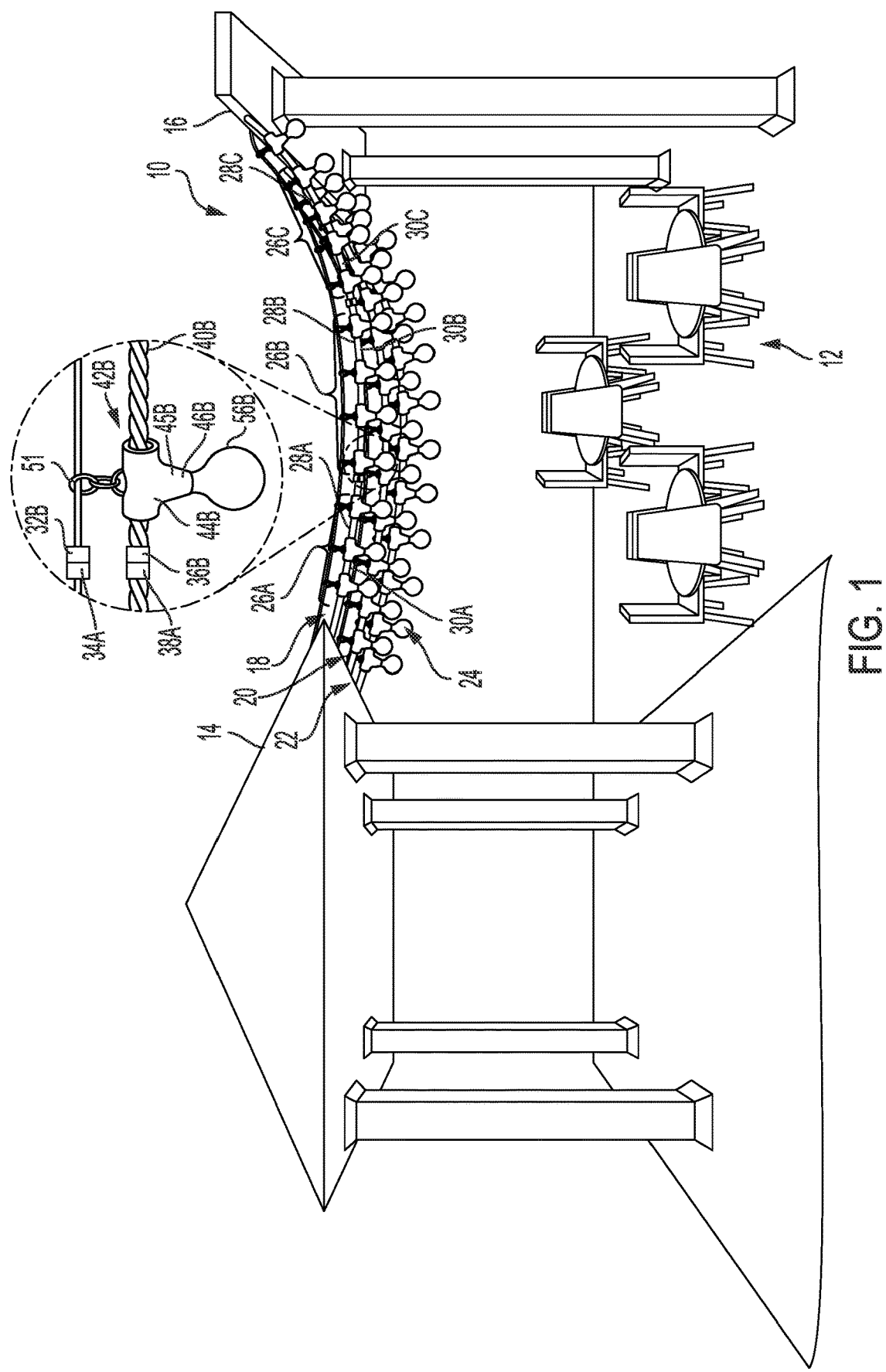
FIG. 1 is a perspective view of adaptable and secure café lighting suspended over an exemplary venue.

FIG. 1 is a perspective view of adaptable and secure café lighting suspended over an exemplary venue. In FIG. 1, Café lighting system 10 is suspended over outdoor cafeteria 12 between pavilion 14 and column support 16. Café lighting system 10 includes four lengths 18, 20, 22, and 24, each suspended by and between pavilion 14 and column support 16. Each of lengths 18, 20, 22, and 24 have substantially the same longitudinal dimension as they are suspended from the same structural support members—pavilion 14 and column support 16. In other venues or configurations, the various lengths of a café lighting system might have longitudinal dimensions different from one another or a single length might constitute the café lighting system.

Each of lengths 18, 20, 22, and 24 includes one or more café lighting sections, interconnected to one another so as to form the length. For example, length 18 has café lighting sections 26A, 26B, and 26C. Each of café lighting sections 26A, 26B, and 26C includes structural support cable 28A, 28B, and 28C and café light string 30A, 30B, and 30C, respectively. Interconnection of café lighting sections 26A, 26B, and 26C of length 18 can be performed by interconnecting structural support cables 28A, 28B, and 28C to one another and interconnecting café light strings 30A, 30B, and 30C to one another.

Interconnecting structural support cables 28A, 28B, and 28C to one another includes mechanically securing adjacent ends of adjacent structural support cables 28A and 28B to one another and mechanically securing adjacent ends of adjacent structural support cables 28B and 28C to one another. Structural support cables 28B has first connecting member 32B at a first end of structural support cable 28B. First connecting member 32B is configured to mechanically connect to second connecting member 34C at a second end of structural support cable 28C, which is adjacent and upstream thereto. Structural support cables 28B has second connecting member 34B at a second end of structural support cable 28B. Second connecting member 34B is configured to mechanically connect to first connecting member 32C at a first end of structural support cable 28A, which is adjacent and downstream thereto. Structural support cables 28A and 28C are configured in a similar fashion as structural support cable 28B, even though only connected to one adjacent structural support cable—structural support cable 28B.

Interconnecting café light strings 30A, 30B, and 30C to one another includes connecting electrical connectors at adjacent ends of adjacent café lighting strings 30A and 30B to one another and connecting electrical connectors at adjacent ends of adjacent café lighting strings 30B and 30C to one another. Café light string 30B has first electrical connector 36B at a first end of café light string 30B. First electrical connector 36B is electrically connect to second electrical connector 38C at a second end of café light string 30C, which is adjacent and upstream thereto. Café light string 30B has second electrical connector 38B at a second end of café light string 30B. Second electrical connector 38B is electrically connect to first electrical connector 38A at a first end of café light string 30A, which is adjacent and downstream thereto. Café light strings 30B also has an electrical cable 40B extending between first and second electrical connectors 36B and 38B. Café light strings 30A and 30C are configured in a similar fashion as café light strings 30B, even though only connected to one adjacent café light strings—café light strings 30B.

Each of café light strings 30A, 30B, and 30C can further include a plurality of café lighting taps 42. Each of the lighting taps 42 can include one or more of the following: i) a cable coupler; ii) a light socket; iii) a pigtail cable; and iv) a light emitting device. As depicted in FIG. 1, lighting tap 42B includes cable coupler 44B, pigtail cable 46B, light socket 48B and light emitting device 50B. Cable coupler 44B is configured to provide electrical power conducted by electrical cable 40B to any connected lighting element, such as lighting element 50B. Lighting element 50B is electrically and mechanically coupled to pigtail 42B via light socket 48B. pigtail cable 46B conducts the electrical power form cable coupler 44B to light socket 48B.

Each of lengths 18, 20, 22, and 24 will have a tensile force applied thereto due to the force required to suspend each length 18, 20, 22, and 24 in its corresponding suspension configuration. Many electrical connectors, such as electrical connectors 32A and 32B, are not configured to maintain good electrical connection therebetween in high tensile situations. Furthermore, applying large tensile forces to electrical elements, such as café light strings 30A, 30B, and 30C, can cause failure of such electrical elements. Therefore, controlling a tensile force applied to interconnected café light strings 30A, 30B, and 30C can facilitates reliability of electrical power provided to the café lights of interconnected café light strings.

Café light string 30B is slidably coupled to structural support cable 28B so as to slidably extended along the structural support cable between first and second mechanical connecting members 32B and 34B of the structural support member 28B. In the depicted embodiment, slidable coupler 52B of lighting tap 42B provides slidable coupling between café light string 30B and structural support member 28B. In other embodiments, slidable couplers need not be associated with lighting taps, such as lighting tap 42B. A series of slidable coupling members can be distributed along café light string 30B. In some embodiments, structural support cable 28B can include first and second retention features configured to retain the plurality of slidable couplers of café light string 30B between first and second connecting members 32B and 34B, respectively, of structural support cable 28B.

To control tensile forces applied to interconnected café light strings 30A, 30B, and 30C, structural support cable 28A, 28B, and 28C have cable lengths that are less than string lengths of café light strings 30A, 30B, and 30C. Such control of cable and string lengths permit tension to be applied to the interconnected structural support cables 28A, 28B, and 28C without such high tension being simultaneously applied to interconnected café light strings 30A, 30B, and 30C.

Figure 2:
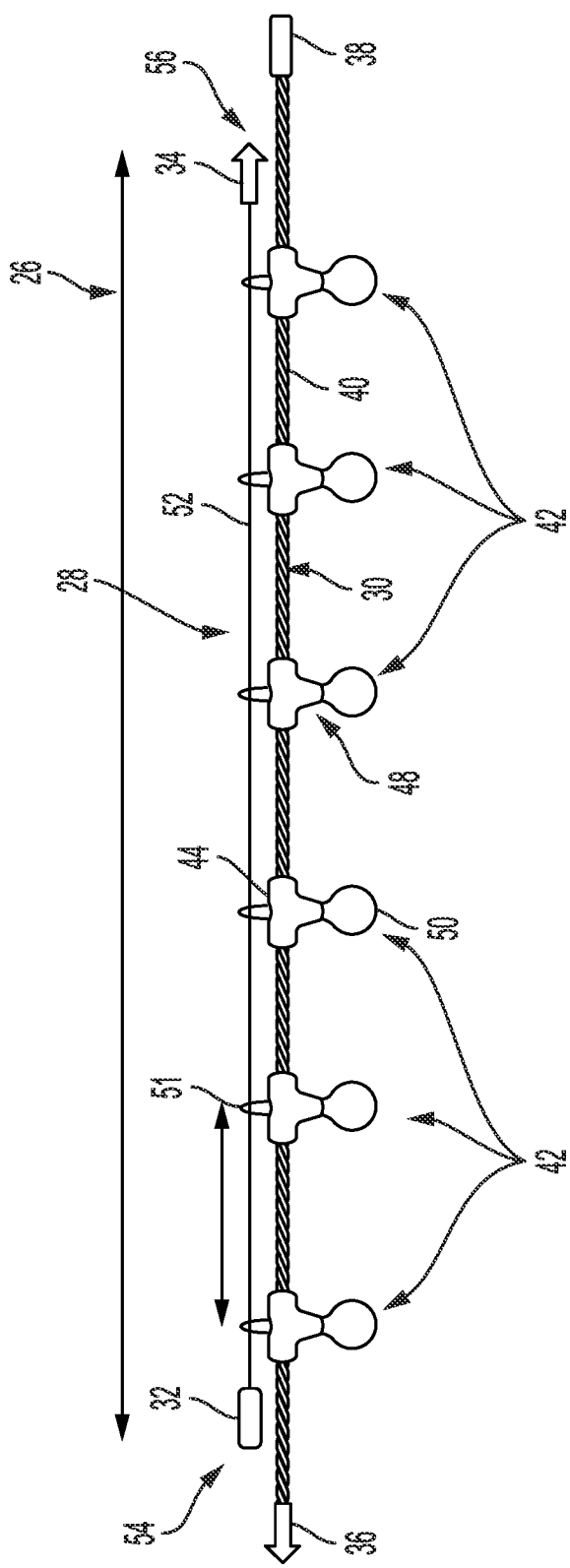
FIG. 2 is a schematic view of an embodiment of a café lighting section having a suspension cable and café light string slidably coupled to one another.

FIG. 2 is a schematic view of an embodiment of a café lighting section having a suspension cable and café light string slidably coupled to one another. In FIG. 2, café lighting section 26 includes structural support cable 28 and café light string 30. Structural support cable 28 includes high-tensile-strength cable 52, first connecting member 32 at first end 54 of structural support cable 28, and second connecting member 34 at second end 56 of structural support cable 28. First and second connecting members 32 and 34 are configured to releasably connect to one another (so as to facilitate daisy-chain connection of a series of interconnected structural support members). In some embodiments, first and second connecting members 32 and 34 can be pin secured couplers, for example. In some embodiments, first and second connecting members 32 and 34 can be rotationally secured couplers. In some embodiments, the coupler can have a detent to indicate secure and/or to lock coupling of first and second connecting members. Various other types of mechanical connectors can be used as well as many such types of mechanical connectors are known in the art. In some embodiments, first and second connecting members can also function as first and second retention features configured to retain the plurality of slidable couplers of café light string 30 between first and second connecting members 32 and 34, respectively, of structural support cable 28.

Figure 3:
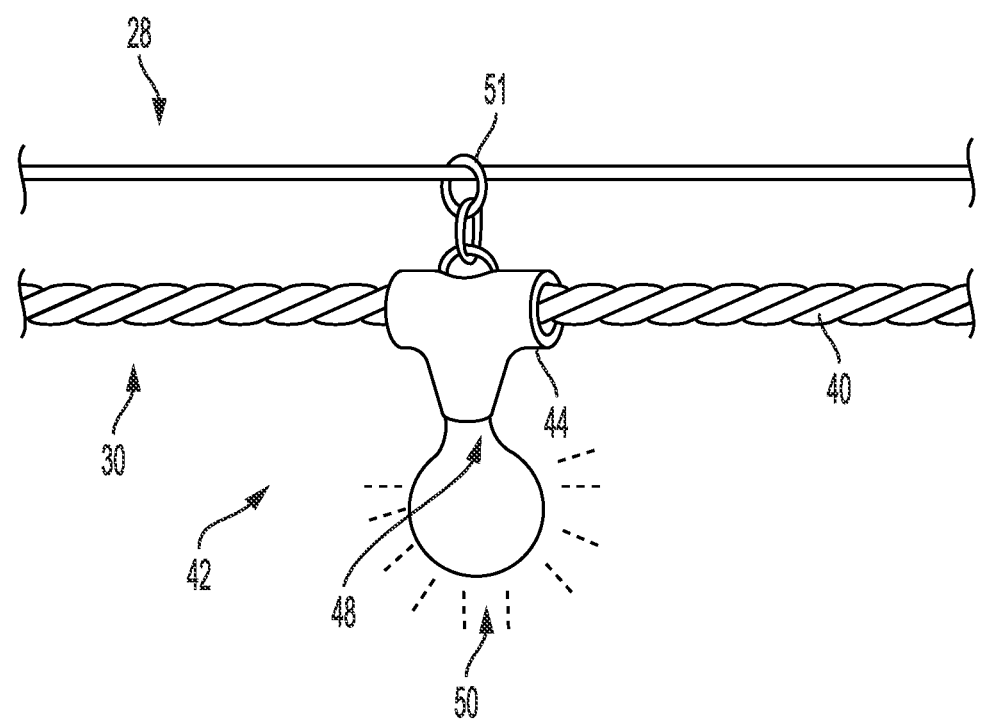
FIG. 3 is a schematic view of a single café lighting tap of the café lighting system depicted in FIG. 2.

Each of lighting taps 42 includes cable coupler 44, light socket 48, light emitting device 50, and slidable coupler 52. Lighting tap 42 is depicted in closeup fashion in FIG. 3. FIG. 3 is a schematic view of a single café lighting tap of the café lighting system depicted in FIG. 2. Café light string 30 includes electrical cable 40, first electrical connector 36 at first end 58 of café light string 30, second electrical connector 38 at second end 60 of café light string and lighting taps 42 distributed along café light string 30. First and second electrical connectors 36 and 38 are configured to releasably connect to one another (so as to facilitate daisy-chain connection of a series of interconnected café light strings). In some embodiments, first and second connecting members 32 and 34 can be pin or blade and socket connectors, for example. Various other types of electrical connectors can be used as well as many such types of electrical connectors are known in the art.

Various types of light emitting devices can be used. For example, incandescent, fluorescent bulbs can be used. In some embodiments, light emitting diodes (LEDs) can be used as light emitting devices 42. Light sockets 48 are configured to receive the type of light emitting device for which café light string 30 is configured. In some embodiments, cable length of structural support cable 28, when in tensile condition (such as when supporting café light section 26) is substantially equal to string length of café light string 30 under substantially no tension. In other embodiments the cable length of structural support cable 28 is less than the string length of café light string 30. For example, in some embodiments, a ratio of cable length to string length is less than 0.99, 0.98, 0.95 or 0.93, for example.

Figure 4:
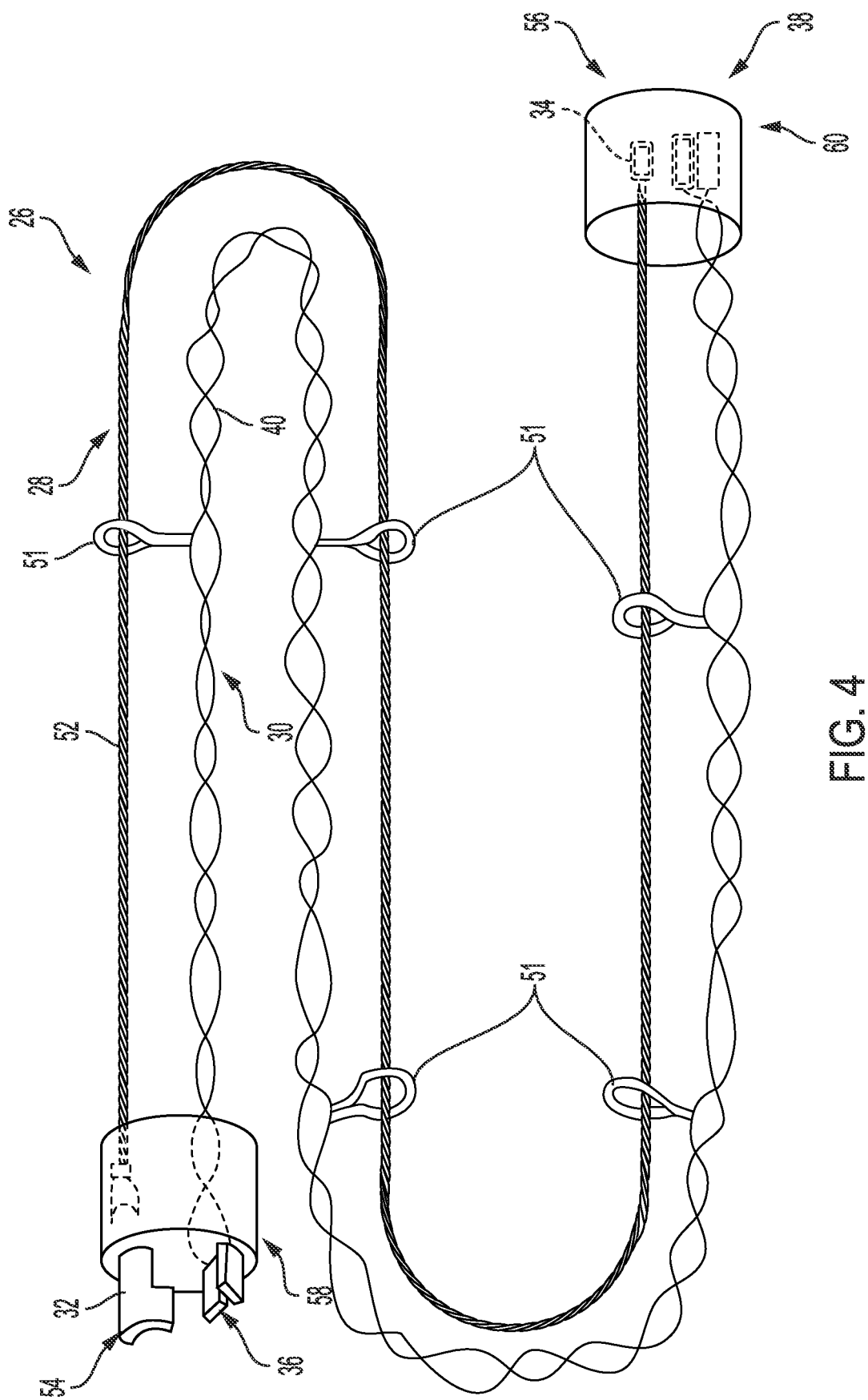
FIG. 4 is a schematic view of another embodiment of a café lighting section having a suspension cable and café light string coupled to one another.

FIG. 4 is a schematic view of another embodiment of a café lighting section having a suspension cable and café light string coupled to one another. In FIG. 4, café lighting section 26 includes structural support cable 28 and café light string 30. Structural support cable 28 includes high-tensile-strength cable 52, first connecting member 32 at first end 54 of structural support cable 28, and second connecting member 34 at second end 56 of structural support cable 28. In the depicted embodiment, first and second connecting members 32 and 34 include manual fasteners (e.g., a tab rotational secured to an aperture). Café light string 30 includes electrical cable 40, first electrical connector 36 at first end 58 of café light string 30, second electrical connector 38 at second end 60 of café light string and lighting taps (not depicted) distributed along café light string 30. In the depicted embodiment, the first and second manual fasteners are combined with first and second electrical connectors, respectively, as first and second unitary body connectors.

Café lighting section 26 further includes a plurality of coupling members 51 that provide coupling between the café light string and the structural support cable. In some embodiments, the coupling members can provide slidable coupling between structural support cable 28 and café light string 30. In such embodiments, a string length of light string 30 is greater than or equal to a cable length of structural support cable 28, so as to ensure that tensile forces associated with suspension of café lighting section 26 are borne primarily by structural support cable 28 and not by light string 30. In other embodiments, the coupling members can provide fixed coupling between structural support cable 28 and café light string 30. In such embodiments, a string section lengths of light string 30 between adjacent coupling members 51 are greater than or equal to corresponding cable section lengths of structural support cable 28 between the adjacent coupling members 51, so as to again ensure that tensile forces associated with suspension of café lighting section 26 are borne primarily by structural support cable 28 and not by light string 30.

Figure 5:
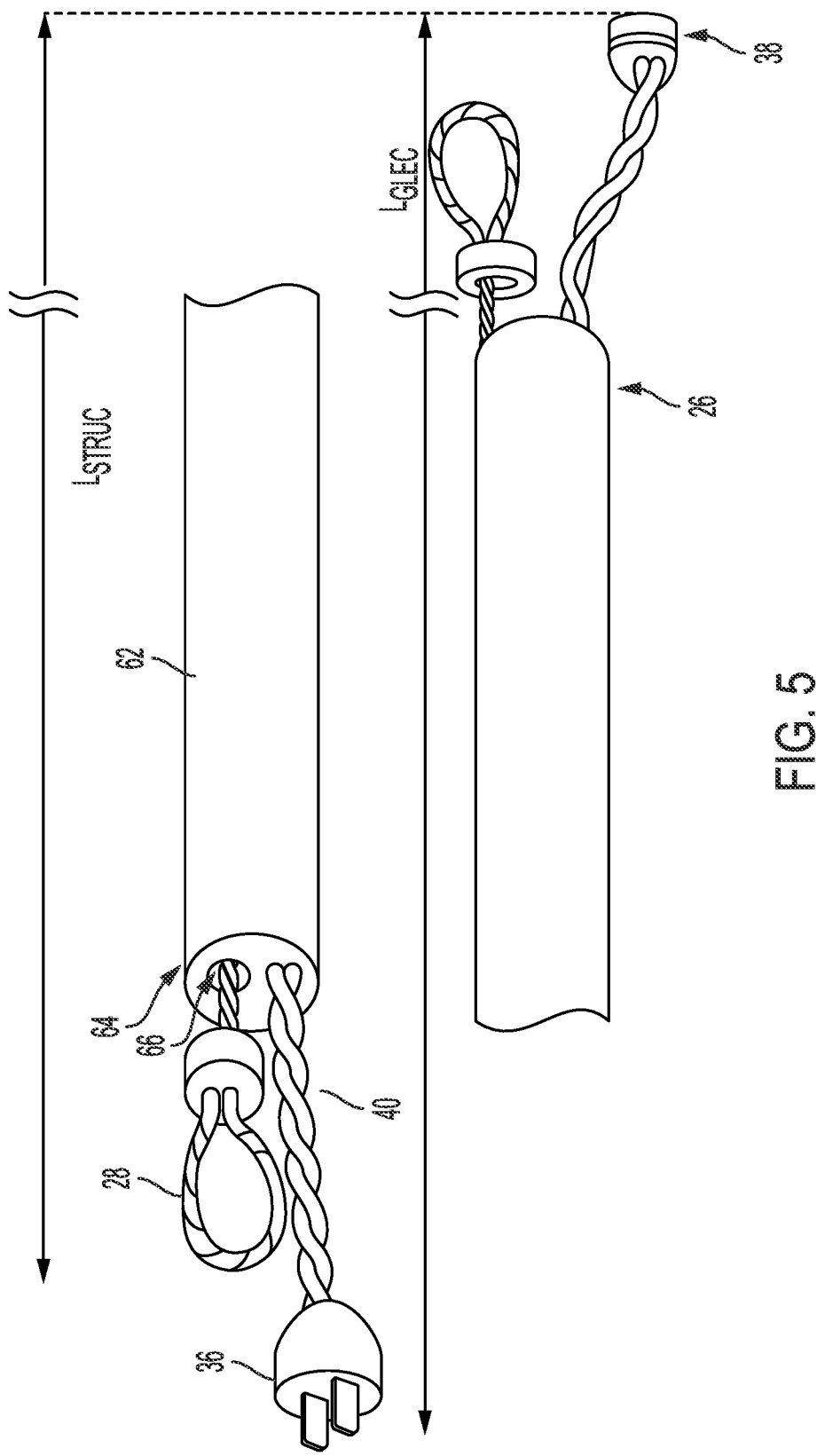
FIG. 5 is a perspective view of an embodiment café lighting section in which the electrical cable and the structural support cable share a common sheath.

FIG. 5 is a perspective view of an embodiment café lighting section in which the electrical cable and the structural support cable share a common sheath. In FIG. 5, café lighting section 26 includes sheath 62, which extends from first end 64 to a second end (not depicted). Sheath 62 slidably couples structural support cable 28 to electrical cable 40. Sheath 62 has a channel 66 (e.g., lumen) through which structural support cable 28 freely can travel. Sheath 62 can either be fixedly attached or slidably attached to electrical cable 40. To reduce tensile forces in electrical cable 40, a length dimensions $L_{ELEC}$ of electrical cable 40 is greater than a length dimensions $L_{STRUC}$ of structural support cable 26. Thus, when suspended, via structural support cable 28 over an expanse, tensile forces upon electrical connectors 36 and 38 will be small so as not to disconnect adjacent connected café lighting sections. Such an embodiment, as depicted in FIG. 5 provides visual simplicity, having only one apparent cable suspended across the expanse. Such visual simplicity is maintained over a sheath length $L_{SHEATH}$ of the sheath. A ratio of the sheath length $L_{SHEATH}$ to either of the length dimensions $L_{ELEC}$ of the length dimensions $L_{STRUC}$ can be greater than 0.90, 0.95, 0.97, or 0.99. In some embodiments, structural support cable 28 and electrical cable 40 can share an end connector, such as the first and second unitary body connectors depicted in the FIG. 4 embodiment.

Figure 6:
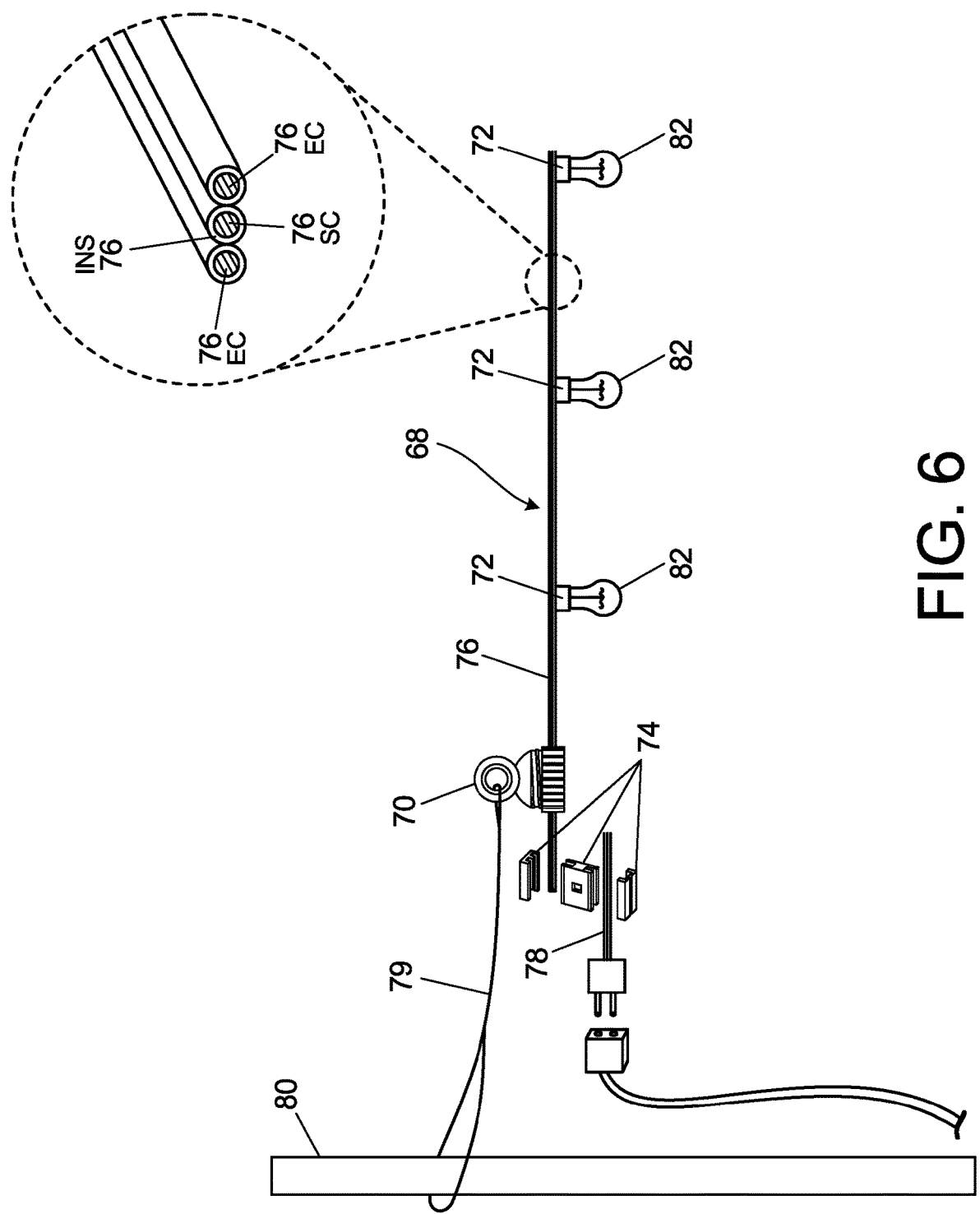
FIG. 6 is a schematic diagram of a custom-length café lighting system having a tensioned section and a non-tensioned section.

FIG. 6 is a schematic diagram of a custom-length café lighting system having a tensioned section and a non-tensioned section. In FIG. 6, café lighting system 68 includes fastening bridge 70, café lighting taps 72, power connector 74, power/support cable 76, power pigtail 78, and lighting elements 82. Café lighting system 68 extends between two supporting members—supporting member 80 on the left of the FIG. 6 drawing and another supporting member (not depicted) on the other end of café lighting system 68. On the left side of FIG. 6, supporting member 80 provides support for café lighting system 68 via structural support cable 79. Structural support cable 79 couples to fastening bridge 70, which in turn is mechanically coupled to power/support cable 76 of café lighting system 68. Another such supporting member and support cable (not depicted), such as those referenced above, provide support of café lighting system 68 on the other side of café lighting system 68. Because café lighting system 68 has weight that results in tension along a length of café lighting system 68 when suspended overhead, café lighting system has elements designed to accommodate such tension such that such tension doesn't result in damage to components of café lighting system 68, as will now be described.

When suspended, power/support cable 76 has a tensioned section that extends between fastening bridges 70, which are located on opposite ends of café lighting system 68. Little tension will exist outside of fastening bridges 70. Thus, power connectors that are located outside of the tensioned section can be configured to experience little tension, thereby shielding electrical connectors from tensile forces that could cause plug separation thereby disrupting power to café lighting system 68. Power/support cable 76 includes insulation 76 INS, electrical conductors 76 EC, and support cable 76 SC. The tensioned section of power/support cable 76 provides support for café lighting system 58 primarily via support cable 76 SC, which can be a steel cable having a high tensile strength, for example. Electrical power is provided along a length of power/support cable 76 via electrical conductors 76 EC, which can be low-resistance copper conductors, for example. Because support cable 76 SC is fashioned from a material that has a tensile strength, which can be much greater than (e.g., at least 2× greater than) a combined tensile strength of material of electrical conductors 76 EC, support of café lighting system 68 is predominantly provided by support cable 76 SC.

Lighting elements 82 are mechanically and electrically connected to power/support cable 76 via café lighting tap 72. Café lighting tap 72 can be custom located along power/support cable 76 and are generally placed in the supported (or tensioned) section of power/support cable 76 (i.e., between fastening bridges 70 located at opposite ends of power/support cable 76). Electrical power is provided to café lighting system 68 via power pigtail 78, which is coupled to the untensioned section of power/support cable 76 (i.e., outside fastening bridges 70 located at opposite ends of power/support cable 76) via power connector 74. Power pigtail 78 can include a female power connector as depicted in FIG. 6 or a male power connector for delivering operating power to another system. Power pigtails, such as power pigtail 78 can be added as is needed in custom fashion.

Café lighting system 68 can be customized in various ways. For example. power/support cable 76 can be cut to a length that spans a dimension of a venue in which it is intended to be used. Power/support cable 76 can be cut using a wire cutter capable of cutting support cable 76 SC as well as electrical conductors 76 EC. Café lighting taps 72 can be added at custom locations along the length of power/support cable 76. Fastening bridges 70, can then be affixed on opposite ends of power/support cable 76, leaving lengths of power/support cable 76 outside of the fastening bridges 70 so that any power pigtails 78 can be connected thereto. In this way, café lighting system 68 can be customized to provide the number of café lights desired to operate over a customized span.

Figure 7:
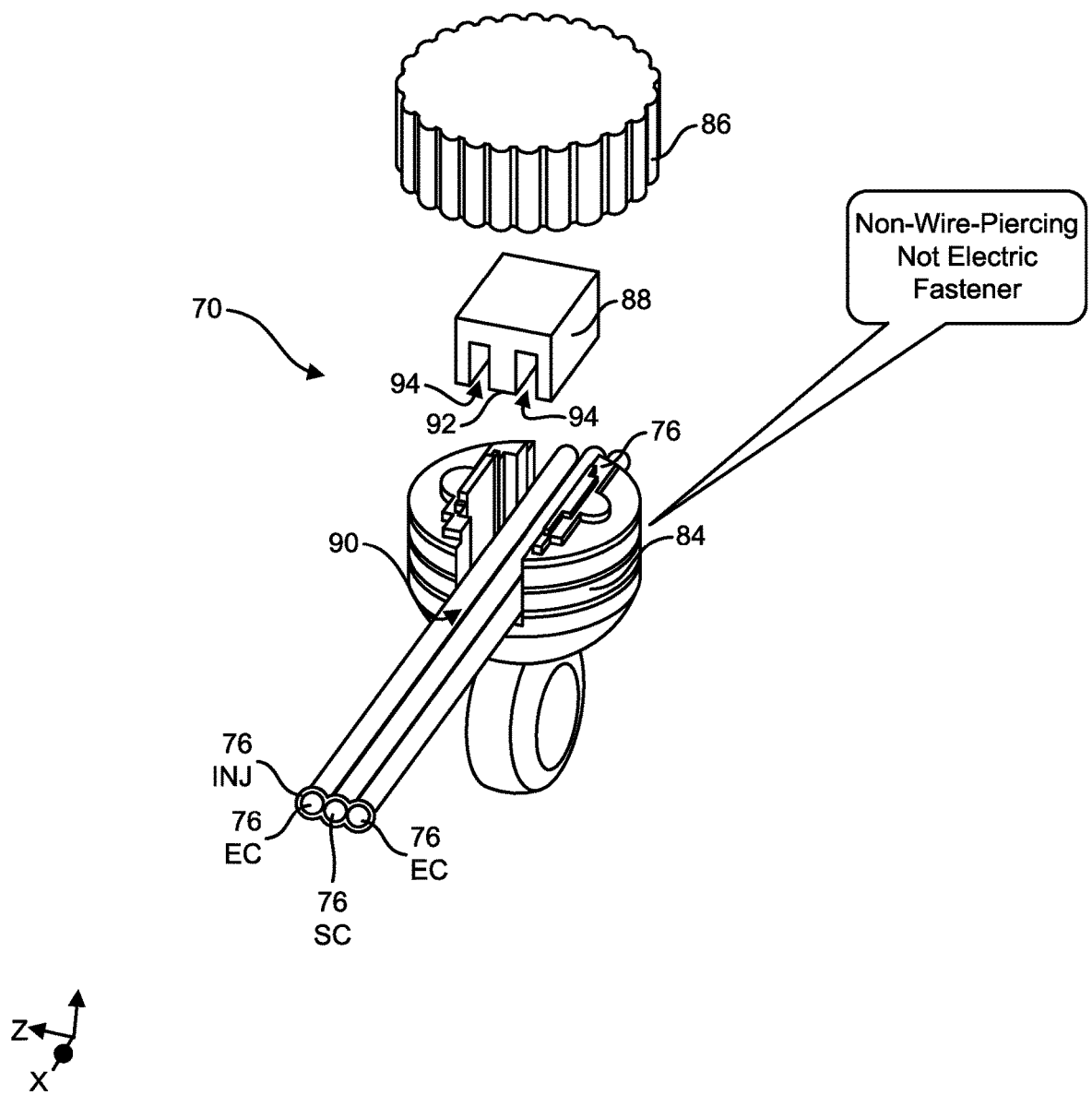
FIG. 7 is a perspective view of another embodiment of a single café lighting tap.

FIG. 7 is a perspective view of an embodiment of a fastening bridge for use in a custom café lighting system. In FIG. 7, fastening bridge 70 includes cable-connecting base 84, securing fixture 86, and cable-pinching member 88. To mechanically connect fastening bridge 70 to power/support cable 76, cable-connecting base 84 is placed at a desired location along the length of power/support cable 76 such that power/support cable 76 traversed through channel 90 of cable-connecting base 84. Then, cable-pinching member 88 is inserted into a widened portion of channel 90. The widened portion of channel 90 is within narrow portions on opposite ends of channel 90. The narrow portions of channel 90 transversely align power/support cable 76 within channel 90. Such widened and narrow portions are also configured to longitudinally secure cable-pinching member 88 within channel 90 of cable-connecting base 80. Cable-pinching member 88 includes projection 92 and recesses 94 on either sides of projection 92. Projection 92 is configured to pinch transversely-aligned support cable 76 SC between projection 92 and a bottom surface of channel 90. Recesses 94 have a depth configured to permit electrical conductors 76 EC to not be pinched as support cable 76 SC is being pinched. Securing fixture 86 is configured to threadably couple to cable-connecting base 84. As securing fixture 86 is threaded upon cable-connecting base 84, securing fixture 86 is drawn toward the bottom surface of channel 90, thereby applying a downward force on cable-pinching member 88. Such a downward force causes cable-pinching member 88 to pinch support cable 76 SC, thereby securing fastening bridge 70 to power/support cable 76. Fastening bridge 70 provides a mechanical connection feature, such as an aperture, which structural support cable 79 can engage. In some embodiments, cable-pinching member is rotatable coupled to securing fixture 86, such that as securing fixture is threaded onto cable-connecting base 84, cable-pinching member can be drawn toward the bottom surface of channel 90 without rotating with respect to cable-connecting base 84.

Figure 8:
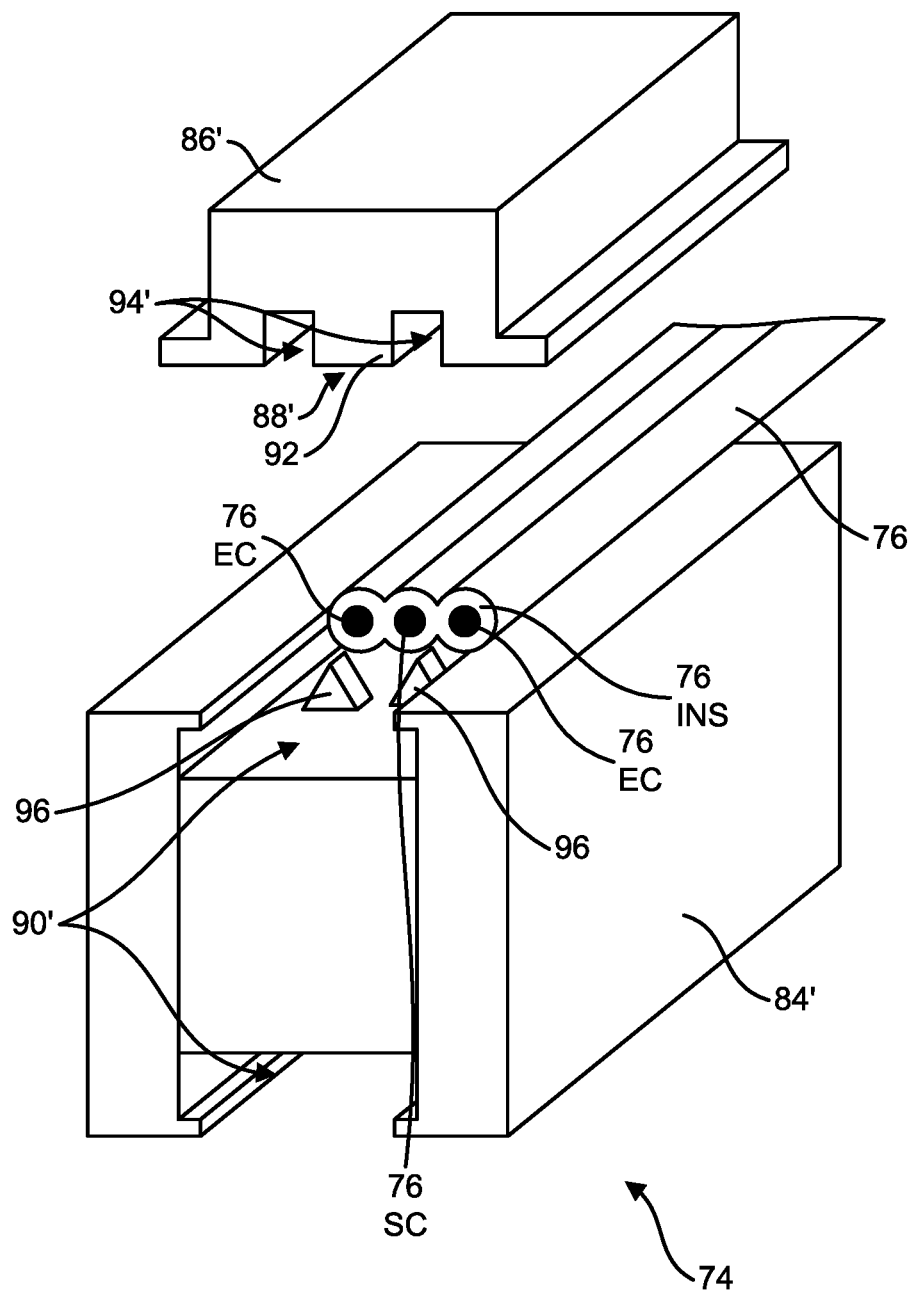
FIG. 8 is a perspective view of a bridge connector for a power tap for customizing a café lighting system.

FIG. 8 is a perspective view of an embodiment of a bridge connector for use in a custom café lighting system. In FIG. 8, bridge connector 74 includes cable-connecting base 84' and top and bottom securing fixtures 86' (of which only top securing fixture 86' is shown). Cable-connecting base 84' is formed with top and bottom channels 90', which are configured to receive power/support cable 76 and power pigtail 78, respectively, therewithin. Piercing members 96 project from bottom surfaces of top and bottom channels 90'. Each of piercing members 96 projecting from the bottom surface of top channel 90' is conductively connected to a corresponding piercing member 96 projecting from the bottom surface of bottom channel 90', thereby providing conductive connection between power/support cable 76 and power pigtail 78, when power/support cable 76 and power pigtail 78 are both received within top and bottom channels 90'. Each of securing fixtures 86' has projection 92' and recesses 94' on opposite sides of projection 92'. Projection 92' is configured to pinch transversely-aligned support cable 76 SC between projection 92' and a bottom surface of channel 90'. Recesses 94' have a depth configured to permit electrical conductors 76 EC to not be pierced by piercing members 96. In the depicted embodiment, securing fixtures 86' and cable-connecting base 84' are configured to slidably engage one another. In other embodiments, securing fixtures 86' and cable-connecting base 84' can be configured to engage one another by snapping together (e.g., as shown in FIG. 9), or via a method shown with regard to FIG. 7 (with separate securing fixture 86, and cable-pinching member 88).

FIG. 9 is a perspective view of a café lighting tap for use in a custom café lighting system. In FIG. 9, café lighting tap 72 includes cable-connecting base 84" and securing fixture 86". Cable-connecting base has lighting-element socket 98 configured to receive a lighting element therewithin. Cable connecting base 84" is formed with channels 90", which is configured to receive power/support cable 76 therewithin. Piercing members 96 project from a bottom surface channels 90". Each of piercing members 96 projecting from the bottom surface of channel 90" is conductively connected to a corresponding electrical contact of lighting-element socket 98, thereby providing conductive connection between power/support cable 76 and any lighting element received with lighting element socket 98. Each of securing fixtures 86" has projection 92" and recesses 94" on opposite sides of projection 92". Securing fixture 86" is configured to snap into cable-connecting base 84", thereby causing piercing members 96 to pierce wire insulation 76 INS of power/support cable 76 within channel 90.

Although the embodiments depicted with reference to FIGS. 6-9 are shown in relation to a café lighting system, the elements of such a lighting system can also be used for any suspended electrical system. For example, suspended fans could be located along power/support cable 76 along with or instead of lighting taps. Although the power/support cable 76 was depicted in FIGS. 6-9 with support cable 76 SC between electrical conductors 76 EC, other configurations are possible. Furthermore, although power/support cable 76 was depicted in FIGS. 6-9 as having only one support cable 76 SC and two electrical conductors 76 EC, more support cables 76 SC and/or more electrical conductors 76 EC are possible. To accommodate such power/support cables, projections 92 and recesses 94 of the cable-pinching member 88 and securing fixtures 86' and 86" would be configured so as to align with such supporting and conducting elements of such power/support cables.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. A fastening bridge for providing structural support engagement for a suspended electrical system, the fastening bridge comprising:
   a cable-connecting base having a channel configured to receive therewithin a power/support cable having a support cable and a plurality of electrical conductors, the support cable and the plurality of electrical conductors laterally spaced apart parallel to one another with insulation providing electrical isolation of the plurality of electrical conductors from one another;
   a securing fixture configured to removably engage the cable-connecting base, the securing fixture further configured to expose the channel when removed so as to permit insertion and/or removal of the power/support cable therewithin; and
   a cable-pinching member having a projection with recesses on either side of the projection, the projection aligned to pinch the support cable between the projection and a bottom surface of the channel, the recesses aligned to permit the plurality electrical conductors to not be pinched as the support cable is being pinched, thereby permitting tension to be applied to the support cable without such tension being simultaneously applied to the plurality of electrical conductors.

2. The fastening bridge of claim 1, wherein the channel has a narrow portion with a width dimension corresponding to a width dimension of the power/support cable, the narrow portion configured to transversely align the power/support cable within the channel.

3. The fastening bridge of claim 2, wherein the channel has a widened portion with a width dimension corresponding to a width dimension of the cable-pinching member, the narrow and widened portions configured to longitudinally secure the cable-pinching member within the channel of the cable-connecting base.

4. The fastening bridge of claim 1, wherein securing fixture has threads configured to engage complementary threads of the cable-connecting base.

5. The fastening bridge of claim 4, wherein the securing fixture is drawn toward a bottom surface of the channel in response to the securing fixture being threaded onto the cable-connecting base.

6. The fastening bridge of claim 5, wherein the support cable is pinched between the cable-pinching member and a bottom surface of the channel in response to the securing fixture being threaded onto the cable-connecting base.

7. The fastening bridge of claim 1, further comprising:
   a mechanical connection feature configured to engage a structural support cable.

8. The fastening bridge of claim 1, wherein the recesses have a depth configured to permit the plurality of electrical conductors to not be pinched as the support cable is being pinched.

9. The fastening bridge of claim 1, wherein the channel is configured to engage the power/support cable anywhere along a length of the power/support cable such that the power/support cable can extend from both of opposite ends of the channel.

10. A suspended electrical tap for providing mechanical and electrical connections between an electrical element and a power/support cable of a suspended electrical system, the suspended electrical tap comprising:
    a cable-connecting base having a channel configured to receive therewithin a power/support cable having a support cable and a plurality of electrical conductors, the support cable and the plurality of electrical conductors laterally spaced apart parallel to one another with insulation providing electrical isolation of the plurality of electrical conductors from one another, the cable-connecting base including:
       a plurality of piercing members projecting from a bottom surface of the channel, the plurality of piercing members aligned so as to pierce the insulation of the plurality of electrical conductors of the power/support cable;
       a lighting-element socket configured to receive the electrical element and to provide electrical connection between contacts of the electrical element received and the plurality of piercing members; and
    a securing fixture configured to removably engage the cable-connecting base, the securing fixture further configured to expose the channel when removed so as to permit insertion and/or removal of the power/support cable therewithin,
    wherein the securing fixture has a projection and recesses on either sides of the projection, the projection aligned to pinch the support cable between the projection and a bottom surface of the channel, the recesses aligned to permit the plurality electrical conductors to not be pinched as the support cable is being pinched, thereby permitting tension to be applied to the support cable without such tension being simultaneously applied to the plurality of electrical conductors.

11. The suspended electrical tap of claim 10, wherein the channel has a width dimension corresponding to a width dimension of the power/support cable, the width dimension of the channel configured to transversely align the power/support cable within the channel.

12. The suspended electrical tap of claim 10, wherein the securing fixture is configured to snap into the cable-connecting base.

13. The suspended electrical tap of claim 12, wherein the plurality of piercing members pierce insulation of the plurality of electrical conductors of the power/support cable in response to the securing fixture being snapped into the cable-connecting base.

14. The suspended electrical tap of claim 10, wherein the channel is configured to engage the power/support cable anywhere along a length of the power/support cable such that the power/support cable can extend from both of opposite ends of the channel.

15. The suspended electrical tap of claim 10, wherein the securing fixture is configured to slidably engage the cable-connecting base.

16. The suspended electrical tap of claim 12, wherein the plurality of piercing members pierce insulation of the plurality of electrical conductors of the power/support cable in response to the securing fixture slidably engaging the cable-connecting base.

17. The suspended electrical tap of claim 10, wherein the securing fixture has a power/support cable engagement member rotatably coupled to a threaded cap.

18. The suspended electrical tap of claim 17, wherein the threaded cap is configured to threadably engage the cable-connecting base.

19. The suspended electrical tap of claim 18, wherein the plurality of piercing members pierce insulation of the plurality of electrical conductors of the power/support cable in response to the threaded cap threadably engaging the cable-connecting base.

* * * * *